(12) United States Patent
Wilkenhoener et al.

(10) Patent No.: US 9,920,182 B2
(45) Date of Patent: Mar. 20, 2018

(54) METHOD FOR MANUFACTURING COMPOSITE PARTICLES

(71) Applicant: Kronos International, Inc., Leverkusen (DE)

(72) Inventors: Uwe Wilkenhoener, Wuppertal (DE); Juergen Bender, Monehim (DE); Ingo Grosser, Cologne (DE)

(73) Assignee: Kronos International, Inc., Leverkusen (DE)

(*) Notice: Subject to any disclaimer, the term of this patent is extended or adjusted under 35 U.S.C. 154(b) by 0 days.

(21) Appl. No.: 14/564,434

(22) Filed: Dec. 9, 2014

(65) Prior Publication Data

US 2015/0166763 A1    Jun. 18, 2015

(30) Foreign Application Priority Data

Dec. 17, 2013 (EP) .................................. 13005850

(51) Int. Cl.
*C08K 3/00* (2006.01)
*C08K 3/32* (2006.01)
(Continued)

(52) U.S. Cl.
CPC .................. *C08K 3/32* (2013.01); *C08K 3/16* (2013.01); *C08K 3/22* (2013.01); *C08K 3/26* (2013.01); *C09C 1/0084* (2013.01); *C09C 1/3661* (2013.01); *C01P 2004/51* (2013.01); *C01P 2004/52* (2013.01); *C01P 2004/61* (2013.01); *C01P 2004/62* (2013.01);
(Continued)

(58) Field of Classification Search
CPC ........................................................ C08K 3/32
See application file for complete search history.

(56) References Cited

U.S. PATENT DOCUMENTS 3,528,838 A      9/1970  Brixner
4,125,412 A  *  11/1978  West .................... C09C 1/3661
                                                        106/446
(Continued)

FOREIGN PATENT DOCUMENTS

EP        0983322        11/1998
EP        1255791         8/2001
(Continued)

*Primary Examiner* — Robert A Vetere
(74) *Attorney, Agent, or Firm* — Locke Lord LLP

(57) ABSTRACT

The invention relates to a method for manufacturing composite particles, particularly composite particles based on titanium dioxide and carbonate, with the help of combined mixing, homogenization and precipitation in a pipeline mixer based on the rotor-stator principle. The method is based on an aqueous suspension of a particulate base component (e.g. titanium dioxide), which is preferably produced in an intermediate vessel equipped with a high-speed agitator. At least one of the required precursor substances and/or a pH-controlling component for precipitating calcium carbonate, for example, is metered into the pipeline mixer, and the calcium carbonate is precipitated. The method can be operated as a continuous process or as a batch process and permits shorter production times. The composite particles produced display homogeneous dispersion of the precipitated particles and the particulate base component.

25 Claims, 6 Drawing Sheets

(51) Int. Cl.
  *C08K 3/22* (2006.01)
  *C08K 3/16* (2006.01)
  *C08K 3/26* (2006.01)
  *C09C 1/36* (2006.01)
  *C09C 1/00* (2006.01)
  *C09C 1/02* (2006.01)

(52) U.S. Cl.
  CPC ............... *C08K 2003/162* (2013.01); *C08K 2003/2241* (2013.01); *C08K 2003/262* (2013.01); *C08K 2003/267* (2013.01); *C08K 2003/324* (2013.01); *C09C 1/02* (2013.01)

(56) References Cited

U.S. PATENT DOCUMENTS

| | | | |
|---|---|---|---|
| 5,082,887 A | 1/1992 | Brown et al. | |
| 5,886,069 A * | 3/1999 | Bolt | B82Y 30/00 106/286.4 |
| 5,993,533 A * | 11/1999 | Diebold | C09C 1/3653 106/442 |
| 6,156,826 A * | 12/2000 | Guenin | A61K 8/11 524/47 |
| 2002/0084050 A1* | 7/2002 | Silenius | D21H 17/69 162/181.1 |
| 2004/0018441 A1* | 1/2004 | Maric | G03G 9/0804 430/137.14 |
| 2004/0161388 A1* | 8/2004 | Liu | A61K 8/19 424/49 |
| 2007/0137526 A1* | 6/2007 | Hager | C01G 23/047 106/436 |
| 2008/0069960 A1* | 3/2008 | Abu-Shanab | C01G 23/047 427/354 |
| 2009/0297852 A1* | 12/2009 | Frahm | C09C 1/3684 428/403 |
| 2011/0011305 A1* | 1/2011 | Maijala | B82Y 30/00 106/31.6 |
| 2013/0057371 A1* | 3/2013 | Shimoyama | B22F 1/0062 335/297 |

FOREIGN PATENT DOCUMENTS

| | | | |
|---|---|---|---|
| EP | 1323764 | 7/2003 | |
| EP | 1644580 | 6/2004 | |
| WO | WO 98/50472 | 11/1998 | |
| WO | WO 00/78874 A1 | 12/2000 | |
| WO | WO 01/59015 | 8/2001 | |
| WO | WO 0159015 A1 * | 8/2001 | ............... C09C 1/42 |
| WO | WO 2005/005725 | 6/2004 | |
| WO | WO 2009/146834 | 5/2009 | |

* cited by examiner

METHOD FOR MANUFACTURING COMPOSITE PARTICLES

RELATED APPLICATIONS

This application claims the benefit of EP Patent App. No. 13005850.6-1355 filed Dec. 17, 2013.

BACKGROUND

Field of the Invention

The invention relates to a method for manufacturing composite particles, particularly composite particles based on titanium dioxide and carbonate, with the help of combined mixing, homogenization and precipitation in a pipeline mixer based on the rotor-stator principle.

Technological Background of the Invention

In paper goods, plastics, paints, coatings, adhesives, rubber, etc., it is customary to use fine, inorganic or organic fillers that serve as extenders and/or improve the technical properties of the matrix material. Different fillers are often used simultaneously in this context. The fillers are then present in the matrix either in a simple blend, or in the form of composite particles that are each composed of at least two different filler particles. Composite particles permit improved dispersion of the filler components in the matrix, and possibly further advantages.

For example, inorganic pigments, and particularly titanium dioxide pigments, are often incorporated into various matrices as whiteners, tinting agents or opacifiers. Owing to its high refractive index, titanium dioxide scatters light particularly efficiently and is therefore the most important white pigment for applications in paints and coatings, plastics, paper and fibers. The light-scattering efficiency declines if the titanium dioxide particles are distributed in the matrix at a distance of less than roughly half the wavelength of the light from each other, i.e. roughly 0.20 to 0.25 µm. The light-scattering efficiency is typically measured with the help of the hiding power or the tinting strength of the titanium dioxide pigment in the matrix.

On the other hand, titanium dioxide is a significant cost factor, and a search has been in progress for some time to find possibilities for reducing the quantity of titanium dioxide used, without having to accept significant losses of hiding power.

Savings are possible by combining titanium dioxide particles with suitable fillers that, as so-called "extender particles", are intended to act as spacers for the $TiO_2$ particles. The known manufacturing methods include both simple blending of the components and also the production of composite particles by bonding the $TiO_2$ particles to the extender particles by means of a precipitated binder, or in-situ precipitation of the extender on the surface of the titanium dioxide particles.

Calcium carbonate is often used as an in-situ precipitated extender. In-situ precipitation is customarily performed by reacting calcium oxide or calcium hydroxide with carbon dioxide. To this end, an aqueous suspension of $TiO_2$ particles or other mineral particles is mixed with CaO or $Ca(OH)_2$, and $CO_2$ gas is subsequently introduced, such that particulate calcium carbonate is precipitated (U.S. Pat. No. 5,082, 887 A, WO 2000/078874 A1, EP 1 255 791 B1, EP 0 983 322 B1, EP 1 323 674 A1, EP 1 644 580 B1). Mixing of the components and precipitation of the extender are performed in a batch process in a vessel.

U.S. Pat. No. 3,528,838 discloses a method where precipitation is performed by reacting two dissolved reactants in the $TiO_2$ suspension. In this case, $TiO_2$ is dispersed in a sodium carbonate solution, and a calcium chloride solution is subsequently added, such that calcium carbonate is precipitated. This method is likewise performed as a batch process in a vessel.

U.S. Pat. No. 5,993,533 A, and also WO 2009/146834 A1, disclose a method for coating titanium dioxide by precipitating inorganic oxides, such as $SiO_2$ and $Al_2O_3$, where a $TiO_2$ suspension is mixed with the oxide precursor substance (first reaction component) in an inline mixer. The mixed suspension is subsequently pumped into a vessel, where the second reaction component (acid) is added, such that the reaction and precipitation can take place.

BRIEF DESCRIPTION OF THE INVENTION

The object of the invention is to indicate an alternative manufacturing method for composite particles that contain at least one particulate carrier component (base component) and at least one in-situ precipitated inorganic particle component.

The object is solved by a method for manufacturing composite particles, containing at least one particulate base component and in-situ precipitated inorganic particles, from an aqueous suspension of the particulate base component, where the suspension is pumped through a pipeline mixer based on the rotor-stator principle, characterized in that at least one dissolved or dispersed precursor compound and/or a pH-controlling component is metered into the pipeline mixer to produce the in-situ precipitated inorganic particles, and the inorganic particles are predominantly precipitated in the pipeline mixer.

Further advantageous embodiments of the invention are indicated in the sub-claims.

BRIEF DESCRIPTION OF THE DRAWINGS

For a more complete understanding of the present invention and for further advantages thereof, reference is now made to the following description taken in conjunction with the accompanying drawings in which.

DESCRIPTION OF THE PREFERRED EMBODIMENT

Figure 1A:
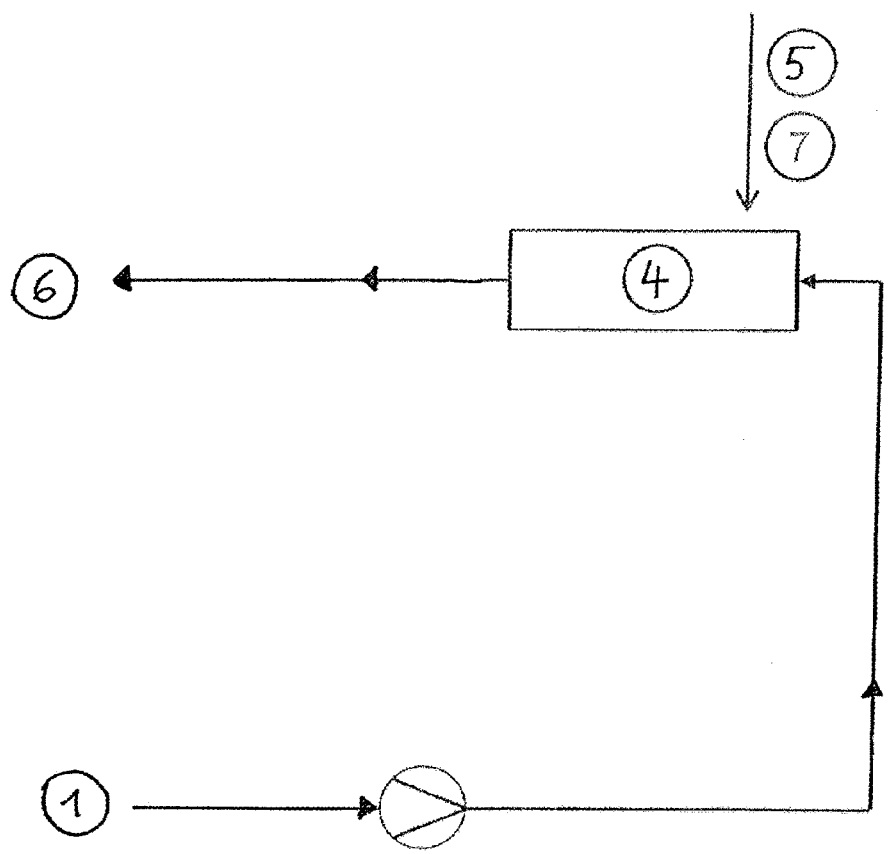
FIG. 1a is a schematic flow chart of the method according to the invention as a continuous process without an intermediate vessel.

The present invention can be better understood by the following discussion of the manufacture and use of certain preferred embodiments. All data disclosed below regarding size in µm etc., concentration in % by weight or % by volume, pH value, etc. are to be interpreted as also encompassing all values lying within the range of the respective measuring accuracy known to the person skilled in the art. Unless otherwise stated, technical grades of the various materials were used in the preferred embodiments. The term "substantially free" is intended to connote that the particular material is not detected (i.e. is below the detection limit) using standard commercial tests and methodologies used in the industry as of the earliest priority date of this application.

The aim of the preferred method according to the invention is to manufacture composite particles that display a homogeneous, narrow particle size distribution, on the one hand, and the most homogeneous possible structure, on the other. "Homogeneous structure" means that the in-situ precipitated inorganic particles are present on the surface of the particles of the base component, and the individual particles of the base component are kept apart by the in-situ precipitated inorganic particles, i.e. that they are homogeneously dispersed within the composite particles and, as far as possible, no agglomerates of the base component occur within the composite particles. A homogeneous structure of the composite particles permits optimum efficiency of the pigment (e.g. titanium dioxide) used in paints, for example, in terms of tinting strength.

The preferred method according to the invention is characterized in that—starting with an aqueous particle suspension—the addition of at least one further liquid or solid component, mixing and homogenization, and reaction and precipitation of the inorganic particles take place in a pipeline mixer (e.g. inline disperser) based on the rotor-stator principle. Mixing of the components, and the reaction and spontaneous precipitation of the inorganic particles during simultaneous energy input, take place in a very confined space, meaning that the concentration, pH, viscosity and temperature gradients normally occurring in agitated vessels are avoided. This makes it possible to manufacture composite particles with a largely homogeneous, narrow particle size distribution and a homogeneous structure.

In contrast to this, only admixing of the first reaction component to the particle suspension is performed in the inline disperser in the known methods from the prior art (e.g. U.S. Pat. No. 5,993,533 A or WO 2009/146834 A1). Addition of the second component—the acid, for example—and thus the reaction and precipitation, only take place after the suspension has been pumped into a further vessel. Composite particles manufactured in this way display pronounced deficits in terms of homogeneous particle size distribution and homogeneous structure.

According to the preferred embodiment of the invention, no gaseous reaction component is used, in contrast to the known methods from the prior art.

On the one hand, use of the pipeline mixer based on the rotor-stator principle leads to optimum wetting and homogenization of the components in the suspension, as well as to homogeneous dispersion of the precipitated inorganic particles and the particulate base component in the composite particle. Beyond this, the preferred method according to the invention leads to substantially shorter production times.

The preferred method according to the invention can moreover be applied independently of viscosity. The viscosity of the suspension is known to change significantly during the precipitation reaction upon spontaneous nucleation in the gel phase. Use of the pipeline mixer based on the rotor-stator principle permits homogenization and pumping even at elevated viscosities of up to 100,000 mPa·s.

The preferred method according to the invention is illustrated schematically in FIGS. 1a, 1b, 2a and 2b. The method is based on an aqueous suspension (1) of the at least one particulate base component. Open to consideration as the particulate base component (carrier particle) are, for example, inorganic pigments, such as titanium dioxide, iron oxide, etc., or commercially known inorganic extenders, such as carbonates, kaolin, talcum, mica, etc., or organic extenders. The suspension can also contain several particulate base components. The suspension can also contain at least one of the precursor substances required for the inorganic particles to be precipitated.

The suspension is preferably produced in an intermediate vessel (2), equipped with a high-speed agitator (3), e.g. a jet stream mixer. The high-speed agitator has a circumferential speed of at least 15 m/s or a specific agitator capacity of at least 30 W/m$^3$.

The aqueous suspension is subsequently pumped through a pipeline mixer (4) based on the rotor-stator principle, e.g. an inline disperser. At least one of the required precursor compounds (5) and/or a pH-controlling component (7) for the particles to be precipitated is metered into the mixing head of the pipeline mixer, optimally incorporated and homogenized, in which context the inorganic particles are precipitated and composite particles formed.

The inorganic particles are predominantly precipitated in the pipeline mixer, i.e. more than 50% by weight, preferably more than 80% by weight.

Figure 1B:
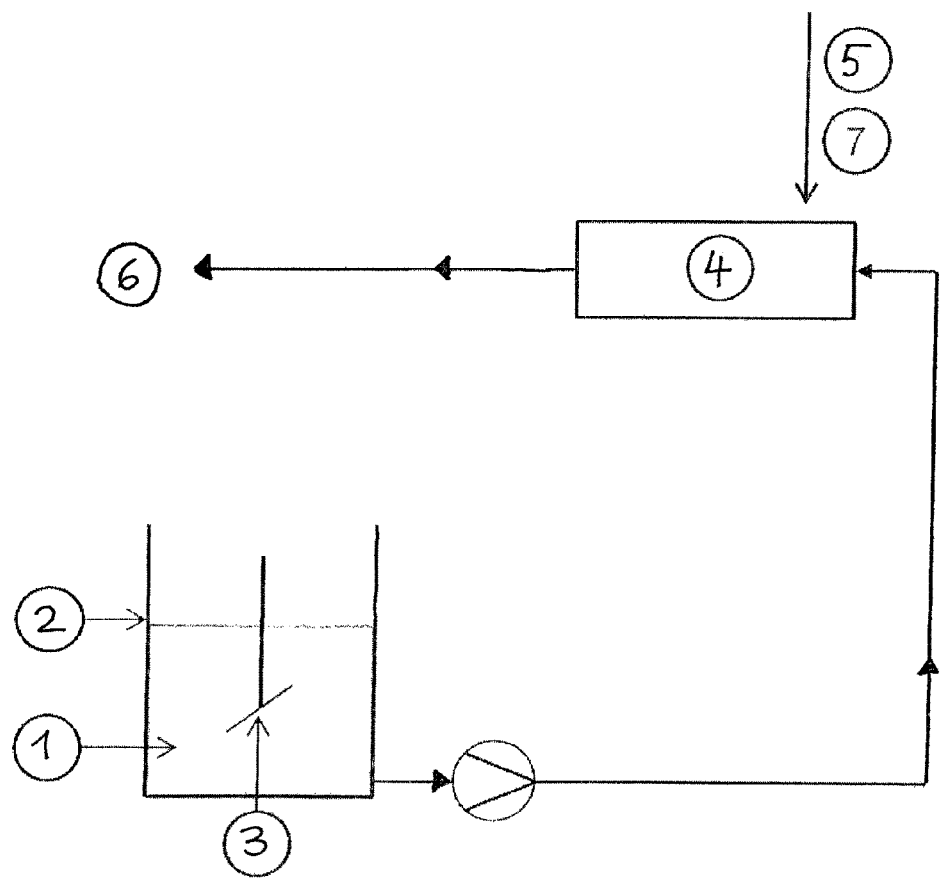
FIG. 1b is a schematic flow chart of the method according to the invention as a continuous process with an intermediate vessel.

In one embodiment of the invention, the suspension with the composite particles is subsequently discharged (6) and the composite particles are separated off. In this case, the manufacturing method according to the invention is operated as a continuous process (FIGS. 1a, 1b).

Figure 2A:
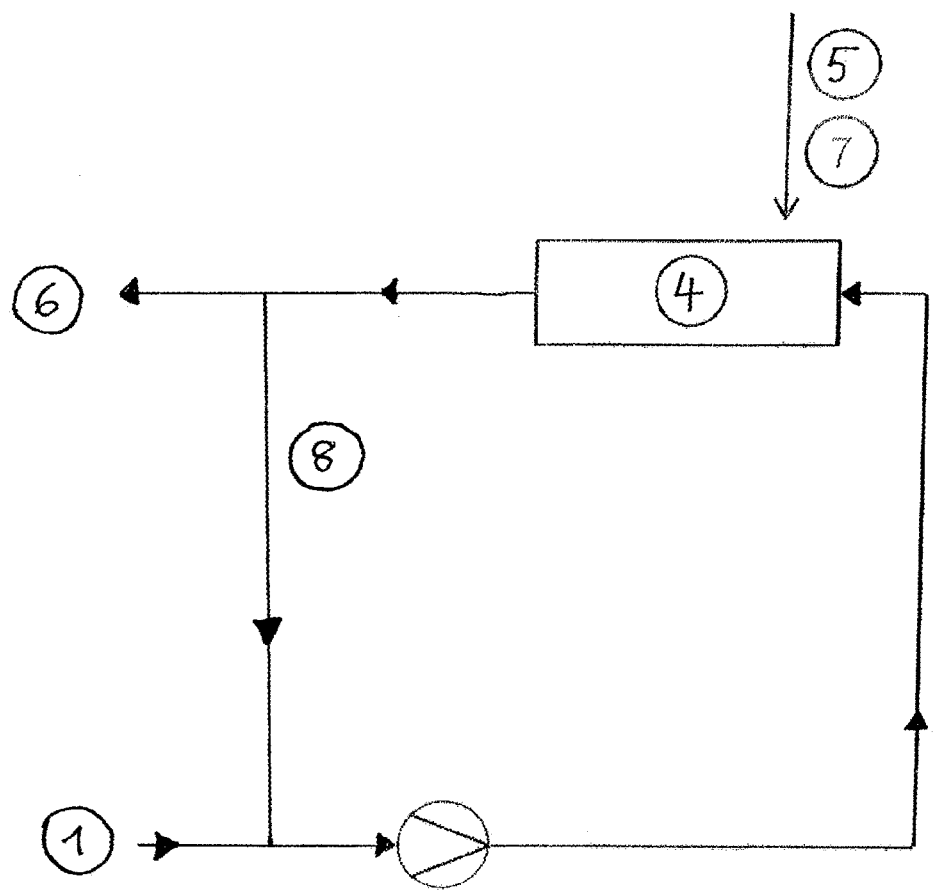
FIG. 2a is a schematic flow chart of the method according to the invention as a batch process without an intermediate vessel.
Figure 2B:
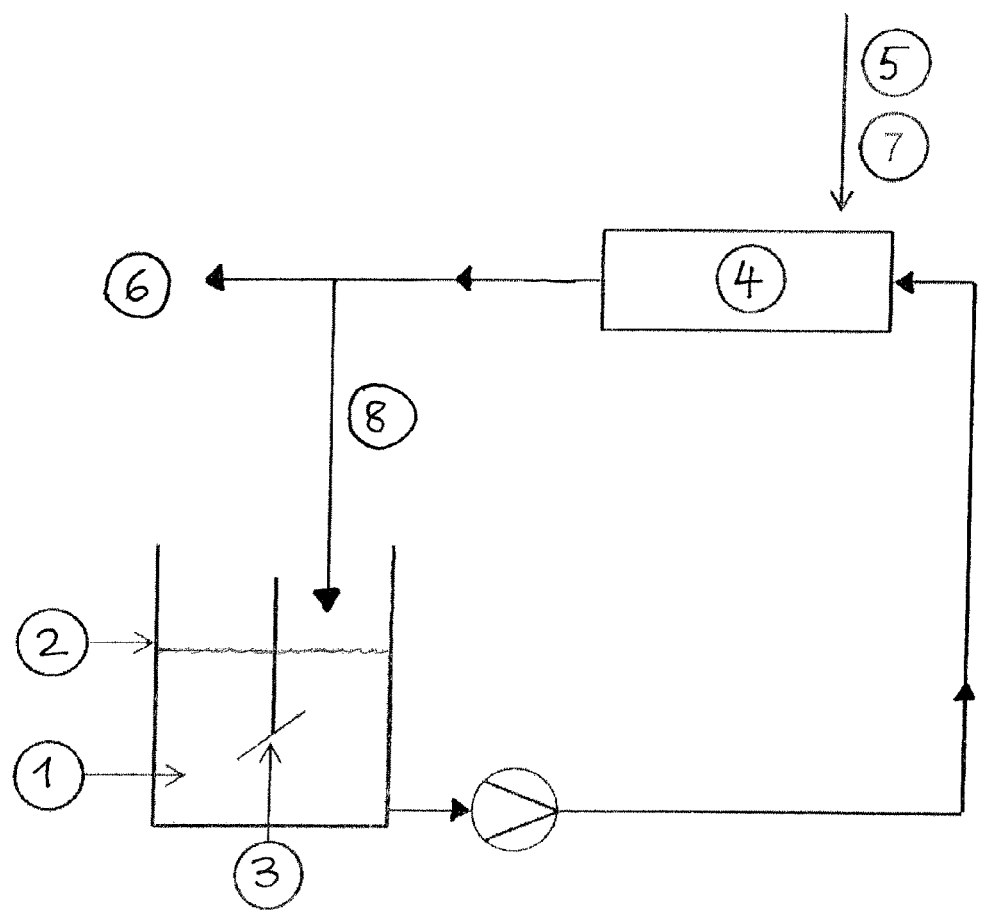
FIG. 2b is a schematic flow chart of the method according to the invention as a batch process with an intermediate vessel.

In another embodiment of the invention, the suspension is conveyed in a circuit (8) through the pipeline mixer (4) and, if applicable, through the intermediate vessel (2). In this case, the method according to the invention is operated as a semi-continuous process (FIG. 2a) or as a batch process (FIG. 2b). The suspension can further be recirculated through the circuit in the manner disclosed and claimed in commonly owned and co-pending U.S. application Ser. No. 14/548,019 to additionally gain the benefits of the invention disclosed and claimed therein.

Open to consideration as the inorganic particles to be precipitated are, for example, carbonates, phosphates, sulfates, hydroxides, silicates. Particularly suitable are alkaline-earth carbonates, phosphates and sulfates, particularly calcium carbonate and calcium phosphate. Also suitable are aluminum hydroxide (e.g. ATH) and aluminum phosphate.

In a special embodiment of the method, composite particles of the kind disclosed in WO 2014/000874 A1 are produced. These composite particles contain titanium dioxide particles as the particulate base component, and at least one inorganic and/or organic extender, as well as in-situ precipitated calcium carbonate particles.

The composite particles according to WO 2014/000874 A1 are characterized in that the titanium dioxide particles are homogeneously distributed on the surface of inorganic or organic filler particles (extenders) and in that a strong bond is created between the extender particle and the titanium dioxide pigment particle by means of in-situ precipitated calcium carbonate, this bond being very difficult to break during further, customary processing by the user, e.g. during dispersion in a dissolver or an inline disperser.

In the context of the invention, the term titanium dioxide particles or titanium dioxide pigment particles is taken to mean particles with a size in the range from roughly 100 nm to roughly 1 µm. Surface-treated or untreated titanium dioxide pigment particles can generally be used. Untreated titanium dioxide base material particles are preferably used, particularly titanium dioxide base material particles from the chloride process. The titanium dioxide pigment particles can be doped, preferably with aluminum. It is particularly advantageous in economic terms to use non-sand-milled, non-dechlorinated titanium dioxide base material particles manufactured by the chloride process. Alternatively, it is also possible to use sand-milled, dechlorinated titanium dioxide base material particles from the chloride process or sand-milled titanium dioxide base material particles from the sulfate process.

Open to consideration as the extender are, in principle, all commercial inorganic or organic extenders known to the person skilled in the art, including blends thereof. Suitable as inorganic extenders are, for example, natural or precipitated calcium or calcium-magnesium or magnesium carbonates, such as marble dust, chalk, precipitated calcium carbonate (PCC), dolomite, huntite, hydromagnesite or magnesite. In this context, "carbonates" also includes carbonates with hydroxide groups and/or water of crystallization. Furthermore suitable are sulfates, such as barium sulfate and calcium sulfate, natural phosphates, hydroxides, such as magnesium hydroxide, aluminum hydroxide or hydrous aluminum oxide, and oxides, such as silicon dioxide in natural, ground, fumed or precipitated form, such as quartz dust, kieselguhr (diatomaceous earth), etc. Furthermore suitable are, for example, silicates and aluminosilicates, such as talcum, zeolites, kaolin, wollastonite, mica, unburnt and burnt clay minerals. Likewise suitable are, for example, perlites and glass dust.

Inorganic or organic fibers can moreover be used as extenders.

White extenders are preferably used. Particularly preferred are Ca—Mg or Mg carbonates, such as dolomite, huntite, hydromagnesite or magnesite.

As a rule, the extender particles have a particle size of 0.1 µm to 100 µm, preferably 0.5 µm to 20 µm, and particularly 1 µm to 10 µm.

The calcium carbonate particles are precipitated as a result of a reaction between the precursor compounds "calcium source" and "carbonate source".

Calcium compounds, such as calcium chloride, calcium nitrate or calcium hydroxide can be used as the calcium source, for example. Furthermore, calcium carbonate in the form of a commercially customary variety of calcium carbonate known to the person skilled in the art can be used as the calcium source. The calcium carbonate used advantageously has a high degree of whiteness and a maximum particle size of roughly 100 µm, preferably 1 µm to 40 µm, and particularly 1 µm to 20 µm. Natural calcium carbonate in the form of chalk or marble dust is preferably used.

For example, basic carbonate, e.g. sodium carbonate, can be used as the carbonate source.

The manufacture of composite particles based on titanium dioxide and calcium carbonate with the help of the method according to the invention can take place in various ways.

One embodiment starts with an aqueous suspension of $TiO_2$ particles and a carbonate source, e.g. sodium carbonate, preferably with a pH value of >8. A calcium source, e.g. calcium chloride, is metered into the pipeline mixer as the second precursor compound, and also a pH-controlling component, if appropriate, such that the pH value is >8 and calcium carbonate is precipitated.

An alternative embodiment starts with an aqueous suspension of $TiO_2$ particles and a calcium source, such as calcium chloride, likewise preferably with a pH value of >8. A carbonate source, e.g. sodium carbonate, is metered into the pipeline mixer as the second precursor compound, and also a pH-controlling component, if appropriate, such that the pH value is >8 and calcium carbonate is precipitated.

According to the invention, a start can also be made with an acid suspension. In this case, the apparatus (pipes, mixer, etc.) must be of acid-proof design. For example, a start is made with an aqueous suspension of $TiO_2$ particles and a calcium source, such as calcium carbonate, as well as a pH-controlling component, in which context the pH value is <5. A carbonate source, e.g. sodium carbonate, is metered into the pipeline mixer, and also a pH-controlling component, if appropriate, such that the pH value is >8 and calcium carbonate is precipitated. Calcium chloride, for example, can be used as the calcium source, instead of calcium carbonate.

Suitable pH-controlling components are known to the person skilled in the art, e.g. lyes or acids. For example, inorganic acids, such as hydrochloric acid or nitric acid, can be used as acid-reacting components. Moreover suitable are acid-reacting salts whose cations do not interfere with the structure of the composite pigment particles and their subsequent use in user systems. Particularly advantageous is the use of acid-reacting compounds occurring in the framework of titanium dioxide production, such as titanyl chloride (titanium oxychloride), as well as hydrochloric acid or hypochlorous acid, which are obtained in the chloride process owing to the nature of the process. For example, the acids occur in the chloride process as a result of dissolution of the chlorine gas during transfer of the pigment to the aqueous phase.

In principle, the method according to the invention works at every possible quantity ratio of the various components. For example, composite particles with proportions of 10 to 90% by weight titanium dioxide and/or extender as the particulate base component and 90 to 10% by weight in-situ precipitated particles can be manufactured.

The temperature during dispersion and precipitation can be controlled in that both the intermediate vessel and the feed line are of double-walled design and heated or cooled accordingly. This makes it possible to set the temperature of the suspension to values between roughly 0° C. and roughly 100° C.

It has, for example, proven to be advantageous to perform dispersion and homogenization of the titanium dioxide suspension at roughly 30° C. to 40° C., and precipitation of the calcium carbonate particles at a higher temperature, e.g. at 50° C. to 60° C.

In a further embodiment of the method, calcium phosphate particles are precipitated as the in-situ precipitated particles. Calcium carbonate, calcium phosphate, calcium chloride, calcium nitrate or burnt or slaked lime can be used as the calcium source, for example. Phosphoric acid, phosphates, hydrogenphosphate or polyphosphates can be used as the phosphorus source, for example.

In a further embodiment of the method according to the invention, further inorganic or organic compounds can be precipitated onto the composite particles, e.g. phosphate, silicon dioxide, aluminum oxide, fluoride, etc., as well as oxalate, for example. The corresponding precursor compounds, such as phosphoric acid for precipitating phosphate, sodium silicate for precipitating silicon dioxide, sodium aluminate for precipitating aluminum oxide, sodium fluoride for precipitating fluoride, oxalic acid for precipitating oxalate, are metered into the pipeline mixer, together with any necessary pH-controlling components. The corresponding precipitation conditions are known to the person skilled in the art.

In a further embodiment of the invention, the composite particles can finally be treated with organic additives, preferably in quantities of 0.05 to 30% by weight, particularly 0.1 to 5% by weight, referred to total solids. The organic additives can be used in both solid and liquid form. Suitable as organic additives are, on the one hand, commercially available, wax-like additives with and without further chemical functionalization. Also suitable, on the other hand, are known dispersants or other auxiliaries customary in paint technology, e.g. for rheology, defoaming, wetting, etc.

The composite particles manufactured according to the invention are particularly suitable for use in coatings, such as interior and exterior emulsion paints, as well as further water-based or solvent-based paint systems. They can furthermore be used in plastics and laminates.

EXAMPLES

The invention is described in more detail on the basis of the examples below, although this is not to be taken as a limitation of the scope of the invention.

Example 1

The following components were used to manufacture the composite particles according to the invention according to Example 1:
Pigment: Sand-milled, dechlorinated titanium dioxide base material from the chloride process in the form of a suspension
Extender: Ultracarb 1250 from Minelco (huntite-hydromagnesite blend)
Calcium source: Calcium chloride solution
Carbonate source: Sodium carbonate (soda, solid)
Additive: Calgon N (sodium hexametaphosphate)
The composite particles were manufactured as follows:
75 g of an aqueous suspension of sand-milled, dechlorinated titanium dioxide base material particles with a solids concentration of 400 g/l $TiO_2$ (1) were put into a vessel (2) with high-speed agitator (3). While stirring, 95 g soda and 382 g water were subsequently added. The suspension was stirred for a further 30 min, in which context the soda dissolved and a pH value of >11 was obtained. This was followed by addition of the additive (0.5% by weight, referred to total solids, including all extenders). While stirring intensively with the high-speed agitator, 135 g Ultracarb 1250 (huntite-hydromagnesite blend) were added to this suspension and subsequently dispersed for approx. 30 min. The suspension was subsequently pumped through the pipeline mixer (4), an inline dispersing mixer, and a quantity of 416 ml 36% calcium chloride solution (240 g/l) was metered into the metering head of the inline disperser (5) and immediately dispersed dynamically by applying shear energy, in which context a pH value of roughly 8.5 was obtained and calcium carbonate was precipitated.

The suspension was subsequently filtered, washed and dried at 120° C. for approx. 16 h.

The composite particles produced had the following composition: 25 parts by weight (pbw) pigment, 46 pbw extender, 29 pbw precipitated $CaCO_3$ and 0.5 pbw additive.

Reference Example 1

Same as Example 1, but with the difference that the suspension was not pumped through an inline disperser, the calcium chloride solution rather being mixed into the suspension in a second vessel with a propeller mixer and calcium carbonate precipitated.

The composite particles produced had the following composition: 25 parts by weight (pbw) pigment, 46 pbw extender, 29 pbw precipitated $CaCO_3$ and 0.5 pbw additive.

Figure 3:
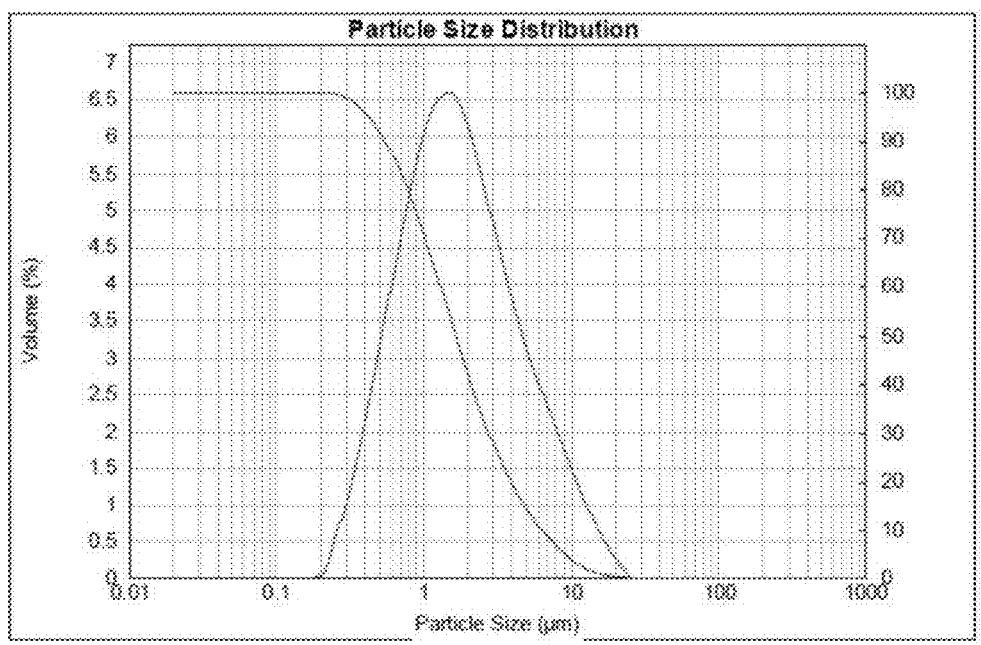
FIG. 3 is a graph of the particle size distribution of the composite particles according to Example 1 with the percent by volume on the ordinate axis and particle size in micrometers on the abscissa axis.
Figure 4:
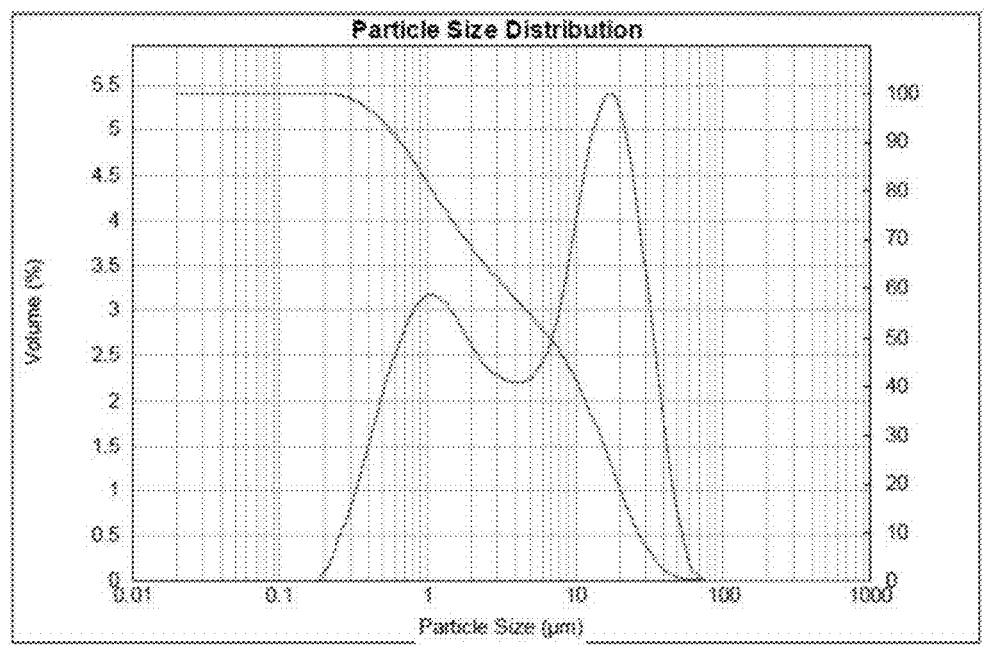
FIG. 4 is a graph of the particle size distribution of the composite particles according to Reference Example 1 with the percent by volume on the ordinate axis and particle size in micrometers on the abscissa axis.

The composite particles produced according to Example 1 and Reference Example 1 were subsequently tested for their particle size distribution by means of laser diffraction, using a Malvern Mastersizer 2000. The results for the particle size distribution are presented in FIGS. 3 and 4 respectively. Compared to composite particles manufactured according to the prior art, the composite particles manufactured according to the invention display a narrow particle size distribution.

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A method for manufacturing composite particles, containing at least one particulate base component and in-situ precipitated inorganic particles comprising:
providing an aqueous suspension of the particulate base component;
pumping the suspension through a pipeline mixer based on the rotor-stator principle;
metering into the pipeline mixer at least one dissolved or dispersed precursor compound and a pH-controlling component for producing the in-situ precipitated inorganic particles;
wherein no gaseous reaction component is added to the pipeline mixer; and
wherein the inorganic particles are predominantly precipitated in the pipeline mixer.

2. The method of claim 1, wherein the aqueous suspension of the particulate base component is produced in an intermediate vessel equipped with a high-speed agitator having a circumferential speed of at least 15 m/s or a specific agitator capacity of at least 30 W/m³.

3. The method of claim 1, wherein in the method is operated as a continuous process.

4. The method of claim 1, wherein in the method is operated in a circuit.

5. The method of claim 1, wherein the particulate base is titanium dioxide.

6. The method of claim 5, wherein the particulate base component comprises at least one extender.

7. The method of claim 6, wherein the extender is selected from the group consisting of marble dust, chalk, precipitated calcium carbonate, dolomite, huntite, hydromagnesite, magnesite, barium sulfate, calcium sulfate, natural phosphates, magnesium hydroxide, aluminum hydroxide, aluminum oxide, silicon dioxide in natural, ground, fumed or precipitated technical form, talcum, zeolites, kaolin, wollastonite, mica, unburnt and burnt clay minerals, perlites, glass dust, inorganic and organic fibres, and mixture thereof.

8. The method of claim 1, wherein the in-situ precipitated particles comprise calcium carbonate.

9. The method of claim 8, wherein the at least one precursor compound is a calcium compound selected from the group consisting of calcium chloride, calcium nitrate, calcium hydroxide and calcium carbonate, basic carbonate, such as sodium carbonate, and mixtures thereof.

10. The method of claim 1, wherein the in-situ precipitated particles are selected from the group consisting of calcium phosphate, aluminum phosphate, aluminum hydroxide, and mixtures thereof.

11. The method of claim 10, wherein the at least one precursor compound for the in-situ precipitation of calcium phosphate is selected from the group consisting of calcium carbonate, calcium phosphate, calcium chloride, calcium nitrate, burnt and slaked lime, as well as phosphoric acid, phosphates, hydrogenphosphate, polyphosphates, and mixtures thereof.

12. The method of claim 1, wherein the temperature of the suspension is set to values between 0° C. and 100° C.

13. The method of claim 1, wherein the composite particles are furthermore coated with one or more inorganic compounds.

14. The method of claim 13, wherein the one or more inorganic compounds is selected from the group consisting of phosphate, silicon dioxide, aluminum oxide, fluoride, or mixtures thereof.

15. The method of claim 1, wherein the composite particles are finally treated with organic additives.

16. The method of claim 1, further comprising using the composite particles in a material selected from the group consisting of coatings, plastics and laminates.

17. A method for manufacturing composite particles, containing at least one titanium dioxide particulate base component and in-situ precipitated inorganic particles comprising:
   providing an aqueous suspension of the particulate base component;
   setting the temperature of the suspension to between 0° and 100° C.;
   pumping the suspension through a pipeline mixer based on the rotor-stator principle;
   metering into the pipeline mixer at least one dissolved or dispersed precursor compound and a pH-controlling component for producing the in-situ precipitated inorganic particles;
   wherein no gaseous reaction component is added to the pipeline mixer;
   wherein the inorganic particles are predominantly precipitated in the pipeline mixer; and
   wherein the in-situ precipitated particles are selected from the group consisting of calcium carbonate, calcium phosphate, aluminum phosphate, aluminum hydroxide, and mixtures thereof.

18. The method of claim 17, wherein the aqueous suspension of the particulate base component is produced in an intermediate vessel equipped with a high-speed agitator having a circumferential speed of at least 15 m/s or a specific agitator capacity of at least 30 W/m$^3$.

19. The method of claim 17, wherein in the method is operated as a continuous process.

20. The method of claim 17, wherein in the method is operated in a circuit.

21. The method of claim 17, wherein the particulate base component comprises at least one extender.

22. The method of claim 21, wherein the extender is selected from the group consisting of marble dust, chalk, precipitated calcium carbonate, dolomite, huntite, hydromagnesite, magnesite, barium sulfate, calcium sulfate, natural phosphates, magnesium hydroxide, aluminum hydroxide, aluminum oxide, silicon dioxide in natural, ground, fumed or precipitated technical form, talcum, zeolites, kaolin, wollastonite, mica, unburnt and burnt clay minerals, perlites, glass dust, inorganic and organic fibres, and mixture thereof.

23. The method of claim 17, wherein the in-situ precipitated particles comprise calcium carbonate and the at least one precursor compound is selected from the group consisting of calcium compounds, such as calcium chloride, calcium nitrate, calcium hydroxide and calcium carbonate, basic carbonate, such as sodium carbonate, and mixtures thereof.

24. The method of claim 17, wherein the in-situ precipitated particles are selected from the group consisting of calcium phosphate, aluminum phosphate, aluminum hydroxide, and mixtures thereof and the at least one precursor compound for the in-situ precipitation of calcium phosphate is selected from the group consisting of calcium carbonate, calcium phosphate, calcium chloride, calcium nitrate, burnt and slaked lime, as well as phosphoric acid, phosphates, hydrogenphosphate, polyphosphates, and mixtures thereof.

25. The method of claim 17, wherein the composite particles are furthermore coated with one or more inorganic compounds.

* * * * *